US010577966B2

(12) United States Patent
Subramanian et al.

(10) Patent No.: US 10,577,966 B2
(45) Date of Patent: Mar. 3, 2020

(54) ROTOR OFF-TAKE ASSEMBLY

(71) Applicant: GENERAL ELECTRIC COMPANY, Schenectady, NY (US)

(72) Inventors: Sesha Subramanian, Karnataka (IN); Santosh Kumar Pattnaik, Karnataka (IN); Swaroop Sundaran, Karnataka (IN); Chandrasekaran N., Karnataka (IN)

(73) Assignee: General Electric Company, Schenectady, NY (US)

( * ) Notice: Subject to any disclaimer, the term of this patent is extended or adjusted under 35 U.S.C. 154(b) by 695 days.

(21) Appl. No.: 15/039,758

(22) PCT Filed: Nov. 25, 2014

(86) PCT No.: PCT/US2014/067223
§ 371 (c)(1),
(2) Date: May 26, 2016

(87) PCT Pub. No.: WO2015/081041
PCT Pub. Date: Jun. 4, 2015

(65) Prior Publication Data
US 2017/0002678 A1    Jan. 5, 2017

Related U.S. Application Data

(60) Provisional application No. 61/909,102, filed on Nov. 26, 2013.

(51) Int. Cl.
*F01D 17/10* (2006.01)
*F01D 5/06* (2006.01)
*F01D 9/04* (2006.01)

(52) U.S. Cl.
CPC ............ *F01D 17/105* (2013.01); *F01D 5/06* (2013.01); *F01D 9/041* (2013.01); *F05D 2220/32* (2013.01); *F05D 2250/283* (2013.01)

(58) Field of Classification Search
CPC ............................ F01D 17/105; F01D 5/087
See application file for complete search history.

(56) References Cited

U.S. PATENT DOCUMENTS

| 4,415,310 A | 11/1983 | Bouiller et al. |
| 4,595,339 A | 6/1986 | Naudet |

(Continued)

FOREIGN PATENT DOCUMENTS

| CN | 202991240 U | 6/2013 |
| CN | 203097955 U | 7/2013 |

(Continued)

OTHER PUBLICATIONS

Machine translation and a Notification of Reasons for Refusal issued in connection with corresponding JP Application No. 2016-533551 dated Apr. 18, 2017.

(Continued)

*Primary Examiner* — Igor Kershteyn
*Assistant Examiner* — Juan G Flores
(74) *Attorney, Agent, or Firm* — Dority & Manning, P.A.

(57) ABSTRACT

According to exemplary embodiments, a rotor off-take assembly is provided by positioning an angled hole or aperture in a stator assembly. This angled hole provides improved pressure recovery and utilizes higher dynamic pressure to drive the bleed air flow into the off-take cavity.

20 Claims, 6 Drawing Sheets

(56) References Cited

U.S. PATENT DOCUMENTS

| | | | |
|---|---|---|---|
| 4,919,590 A | 4/1990 | Stratford et al. | |
| 5,098,257 A | 3/1992 | Kent et al. | |
| 6,663,346 B2* | 12/2003 | Munsell | B64D 13/00 |
| | | | 415/115 |
| 6,832,891 B2* | 12/2004 | Aschenbruck | F01D 11/025 |
| | | | 415/115 |
| 6,857,851 B2 | 2/2005 | Avignon et al. | |
| 7,086,830 B2 | 8/2006 | Fitzgerald et al. | |
| 7,159,402 B2 | 1/2007 | Hein et al. | |
| 8,079,803 B2* | 12/2011 | Takamura | F01D 5/081 |
| | | | 415/115 |
| 8,465,252 B2 | 6/2013 | Bintz et al. | |
| 2002/0108376 A1 | 8/2002 | Eloy | |
| 2002/0182059 A1* | 12/2002 | Escure | F01D 5/082 |
| | | | 415/115 |
| 2003/0133796 A1 | 7/2003 | Munsell et al. | |
| 2004/0081552 A1 | 4/2004 | Volker | |

FOREIGN PATENT DOCUMENTS

| | | |
|---|---|---|
| EP | 1795707 A2 | 6/2007 |
| EP | 2428648 A2 | 3/2012 |
| FR | 2672943 A1 | 8/1992 |
| JP | H05-214963 A | 8/1993 |
| JP | 2003-214187 A | 7/2003 |
| JP | 2003-301702 A | 10/2003 |

OTHER PUBLICATIONS

Machine translation and a Second Office Action and Supplementary Search issued in connection with corresponding CN Application No. 201480064693.9 dated Jul. 12, 2017.

International Search Report and Written Opinion dated Mar. 24, 2015 which was issued in connection with PCT Patent Application No. PCT/US14/67223 which was filed on Nov. 25, 2014.

Pfitzner et al., "Development of an Aeroengine Secondary Air System Employing Vortex Reducers", 22nd International Congress of Aeronautical Sciences, Harrogate International Conference Centre, UK, Aug. 27-Sep. 1, 2000.

Office Action issued in connection with corresponding CN Application No. 201480064693.9 dated Jan. 17, 2017.

\* cited by examiner

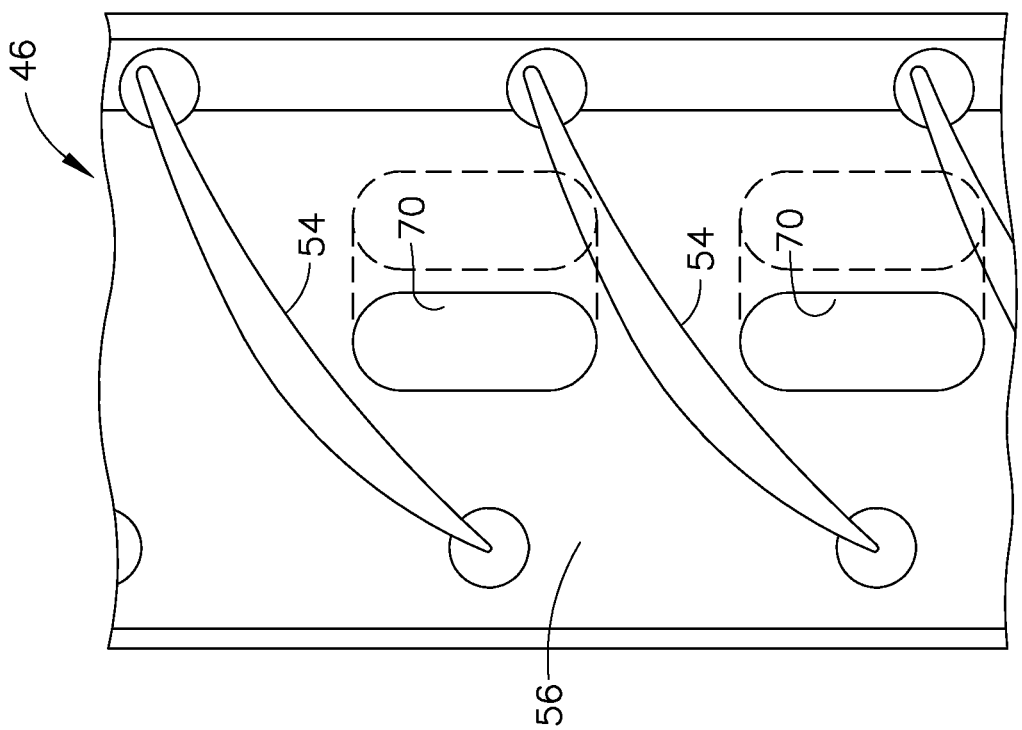

ROTOR OFF-TAKE ASSEMBLY

BACKGROUND

Present embodiments relate to a gas turbine engine. More particularly, but not by way of limitation, present embodiments relate to a rotor off-take aperture in the stator vane.

In the gas turbine engine, air is pressurized in a compressor and mixed with fuel in a combustor for generating hot combustion gases which flow downstream through turbine stages. These turbine stages extract energy from the combustion gases. A high pressure turbine includes a first stage nozzle and a rotor assembly having a disk and a plurality of turbine blades. The high pressure turbine first receives the hot combustion gases from the combustor and includes a first stage stator nozzle that directs the combustion gases downstream through a row of high pressure turbine rotor blades extending radially outwardly from a first rotor disk. In a two stage turbine, a second stage stator nozzle is positioned downstream of the first stage blades followed in turn by a row of second stage turbine blades extending radially outwardly from a second rotor disk. The stator nozzles direct the hot combustion gas in a manner to maximize extraction at the adjacent downstream turbine blades.

The first and second rotor disks are joined to the compressor by a corresponding high pressure rotor shaft for powering the compressor during operation. These are typically referred to as the high pressure turbine. The gas turbine engine may include a number of stages of static air foils, commonly referred to as vanes, interspaced in the engine axial direction between rotating air foils commonly referred to as blades. A multi-stage low pressure turbine follows the two stage high pressure turbine and is typically joined by a second low pressure shaft to a fan disposed upstream from the compressor in a typical turbofan aircraft engine configuration for powering an aircraft in flight.

The stator is formed by a plurality of nozzle segments which are abutted at circumferential ends to form a complete ring about the axis of the gas turbine engine. Each nozzle segment may comprise a single vane, commonly referred to as a singlet. Alternatively, a nozzle segment may have two vanes per segment, which are generally referred to as doublets. In a third embodiment, additional numbers of vanes may be disposed on a single segment. In these embodiments, the vanes extend between an inner band and an outer band.

As the combustion gases flow downstream through the turbine stages, energy is extracted therefrom and the pressure of the combustion gas is reduced. The extracted energy rotates the turbine and the compressor. In this manner, fuel energy is converted to mechanical energy of the rotating shaft to power the compressor and supply compressed air needed to continue the process.

In the current state of the art, rotor bleed off-take systems utilize a gap between a vane exit and a rotor inlet for bleed extraction. In these current systems, the off-take requires air turning from the stator inner flow surface at an angle of about 90 degrees, and sometimes even more, to move between the fixed stator flow surface and the adjacent rotor inlet. However, one problem with the current state of the art is that as the air turns from the stator vane exit, the air encounters the turning structure of the adjacent rotor which causes swirl of the air and pressure drops in the sealed cavity area. Additionally, since the air turns 90 degrees, very little available kinetic head is utilized to drive the flow of the bleed air to the off-take cavity.

Because of these configurations, it would be desirable to reduce pressure drops when the bleed air moves from above the stator flow surface to within the off-take cavity. It may also be desirable to increase pressure recovery while also reducing swirl which occurs due to rotation in the area where air encounters rotor rotation. It would be further desirable to use sufficiently higher dynamic pressure to drive this flow and increase pressure recovery at the flow off-take source.

It would be desirable to improve these characteristics through the use of high kinetic head to drive bleed air through the off-take cavity while reducing vortex and providing pressure recovery to the bleed air.

The information included in this Background section of the specification, including any references cited herein and any description or discussion thereof, is included for technical reference purposes only and is not to be regarded subject matter by which the scope of the instant embodiments are to be bound.

BRIEF DESCRIPTION OF THE INVENTION

According to exemplary embodiments, a rotor off-take assembly is provided by positioning an angled hole or aperture in a stator assembly. This angled hole provides improved pressure recovery and utilizes higher dynamic pressure to drive the bleed air flow into the off-take cavity.

According to some embodiments, a rotor off-take assembly for improved pressure recovery comprises a first rotor disk, including at least one first blade connected to the first rotor disk and extending radially outwardly, a second rotor disk, including at least one second blade connected to the second rotor disk and extending radially outwardly. At least one stator assembly is disposed between the first rotor disk and the second rotor disk. The stator assembly includes a flow surface generally extending from adjacent the first rotor disk assembly toward the second rotor disk assembly. The stator assembly includes an off-take aperture extending downwardly at a non-perpendicular angle through the flow surface wherein air passes through the off-take aperture of the stator assembly reducing swirl.

All of the above outlined features are to be understood as exemplary only and many more features and objectives of the invention may be gleaned from the disclosure herein. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims. Therefore, no limiting interpretation of this summary is to be understood without further reading of the entire specification, claims, and drawings included herewith.

BRIEF DESCRIPTION OF THE DRAWINGS

The above-mentioned and other features and advantages of these embodiments, and the manner of attaining them, will become more apparent and the rotor off-take aperture in the stator vane will be better understood by reference to the following description of embodiments taken in conjunction with the accompanying drawings, wherein.

DETAILED DESCRIPTION

Figure 1:
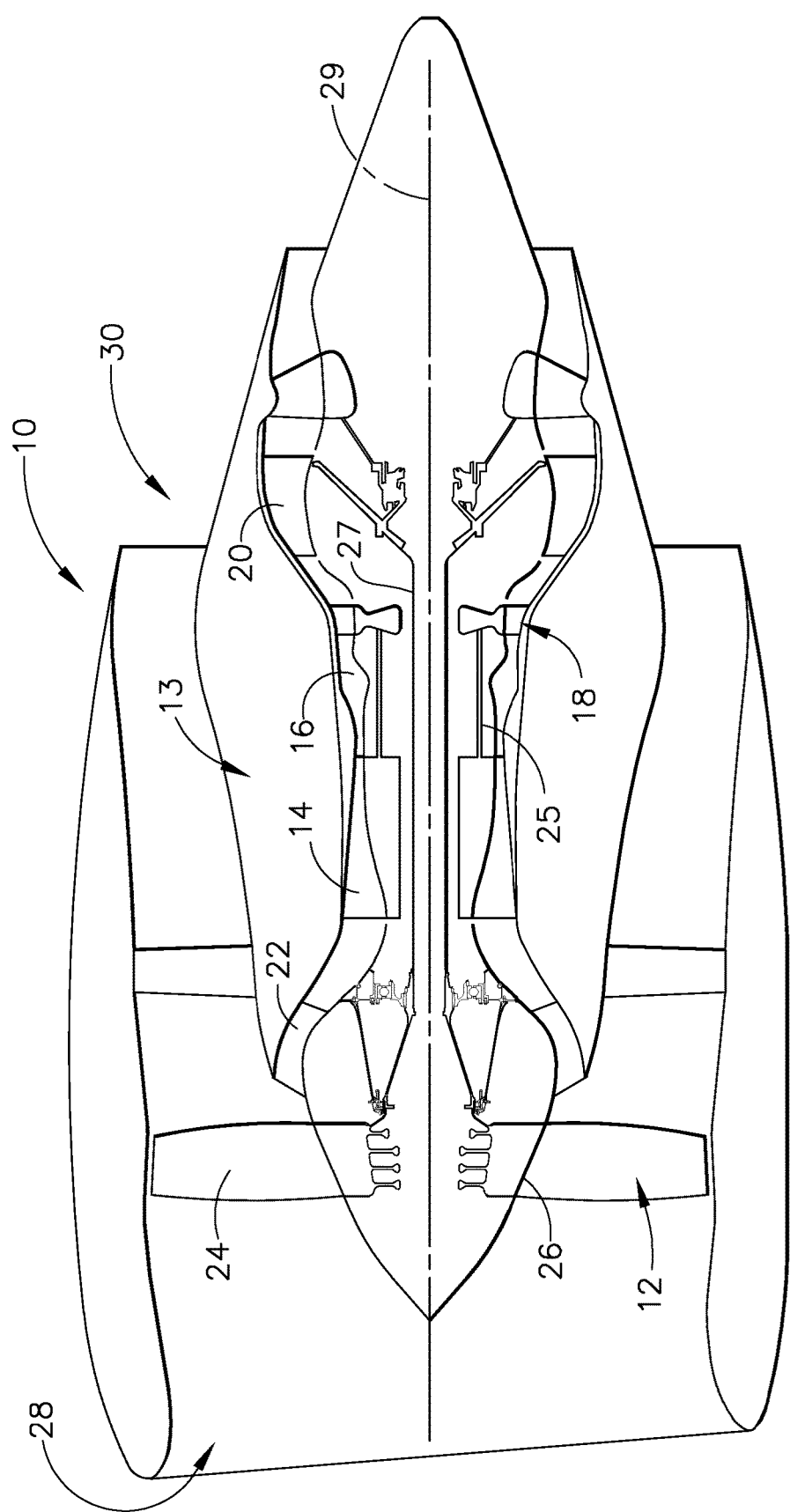
FIG. 1 is a schematic illustration of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus, it is intended that the present invention covers such modifications and variations as come within the scope of the appended claims and their equivalents.

Referring now to FIGS. 1-7, various embodiments are depicted for an off-take for improved pressure recovery. The depicted embodiments show an off-take aperture disposed within the stator vanes of a high pressure compressor. However, the pressure recovery schemes may also be utilized in the high pressure turbine as needed to move bleed air and utilize kinetic head to improve pressure recovery. Instant embodiments utilize an off-take aperture positioned in a stator flow path surface which is in flow communication with an angled flow path extending through the stator vane and toward the off-take cavity. The embodiment allows for air to move a non-rotating structure which reduces swirl and further provides a smaller angle of turn for the bleed air to move through. This allows improved use of kinetic head to increase pressure recovery. Additionally, adjacent structures such as the de-swirling or vortex tube may be decreased in length which reduces weight of the aircraft engine while improving performance.

The terms "fore" and "aft" are used with respect to the engine axis and generally mean toward the front of the gas turbine engine or the rear of the gas turbine engine in the direction of the engine axis.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

FIG. 1 is a schematic illustration of a gas turbine engine 10 including a fan assembly 12, a high pressure compressor 14, and a combustor 16. Gas turbine engine 10 also includes a high pressure turbine 18, a low pressure turbine 20, and a low pressure compressor 22. Fan assembly 12 includes an array of fan blades 24 extending radially outward from a fan rotor disk 26. Gas turbine engine 10 has an intake side 28 and an exhaust side 30. In one embodiment, gas turbine engine 10 is a gas turbine engine commercially available from General Electric Company.

In operation, air flows through the fan assembly 12 and compressed air is supplied to high pressure compressor 14. The highly compressed air is delivered to combustor 16. Exhaust gas (not shown in FIG. 1) from combustor 16 drives turbines 18 and 20, such that the high pressure turbine 18 drives the high pressure compressor 14 by way of a high pressure shaft 25 and the low pressure turbine 20 drives the low pressure compressor 22 and the fan assembly 12 by way of a low pressure shaft 27.

Figure 2:
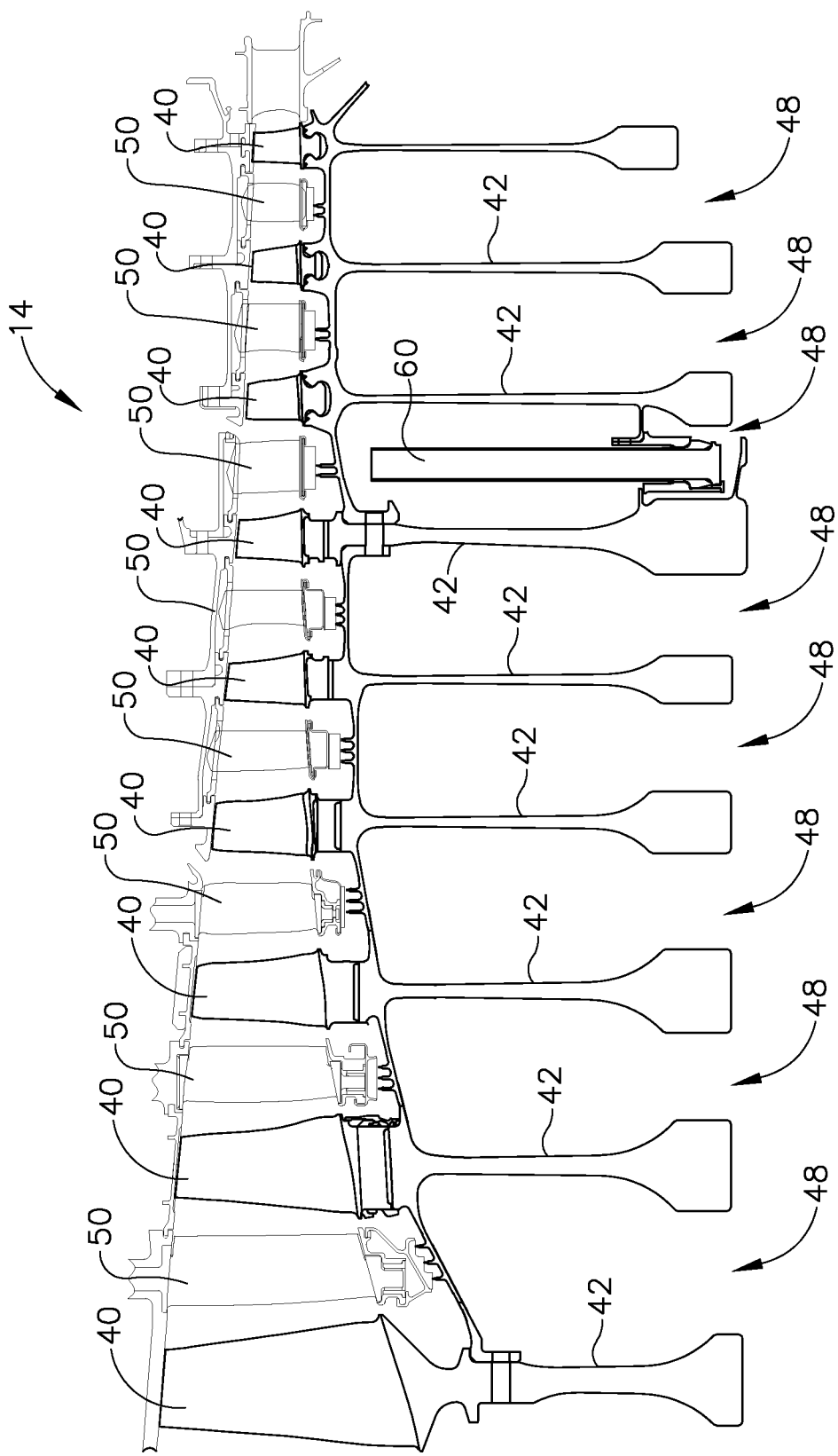
FIG. 2 is a side section view of a high pressure compressor.

Referring now to FIG. 2, a side section view of an exemplary high pressure compressor 14 is depicted. The high pressure compressor 14 comprises a plurality of rotor blades 40 which are fixed to compressor rotor disks 42 such that as the compressor rotor disks 42 rotate, the rotor blades 40 rotate with the compressor rotor disk 42. The compressor rotor disks 42 and rotor blades 40 may be formed integrally, which are referred to as blisks or may be connected as depicted, for example a dovetail connection.

Axially between the rotor blades 40 are a plurality of stator assemblies 50. The stator assembly 50 is disposed between the rotor blades 40 and has surface curvature so as to turn the air exiting a first rotor blade 40 so as to maximize the compression which is created at a subsequent rotor blade 40. The compressor rotor disks 42 are connected and extend beneath the stator 50 and may be sealed in a variety of fashions as described and shown further herein. A plurality of off-take cavities 48 are defined between the compressor rotor disks 42. The off-take cavities 48 receive bleed air 53 (FIG. 3) which moves between the stator assembly 50 and rotor blades 40. This bleed air 53 is subsequently utilized as cooling air or ducted to other locations of the gas turbine engine 10. Between one or more pairs of compressor rotor disks 42 are impeller tubes 60. These impeller tubes 60 reduce swirl or vortex of the bleed air 53.

Figure 3:
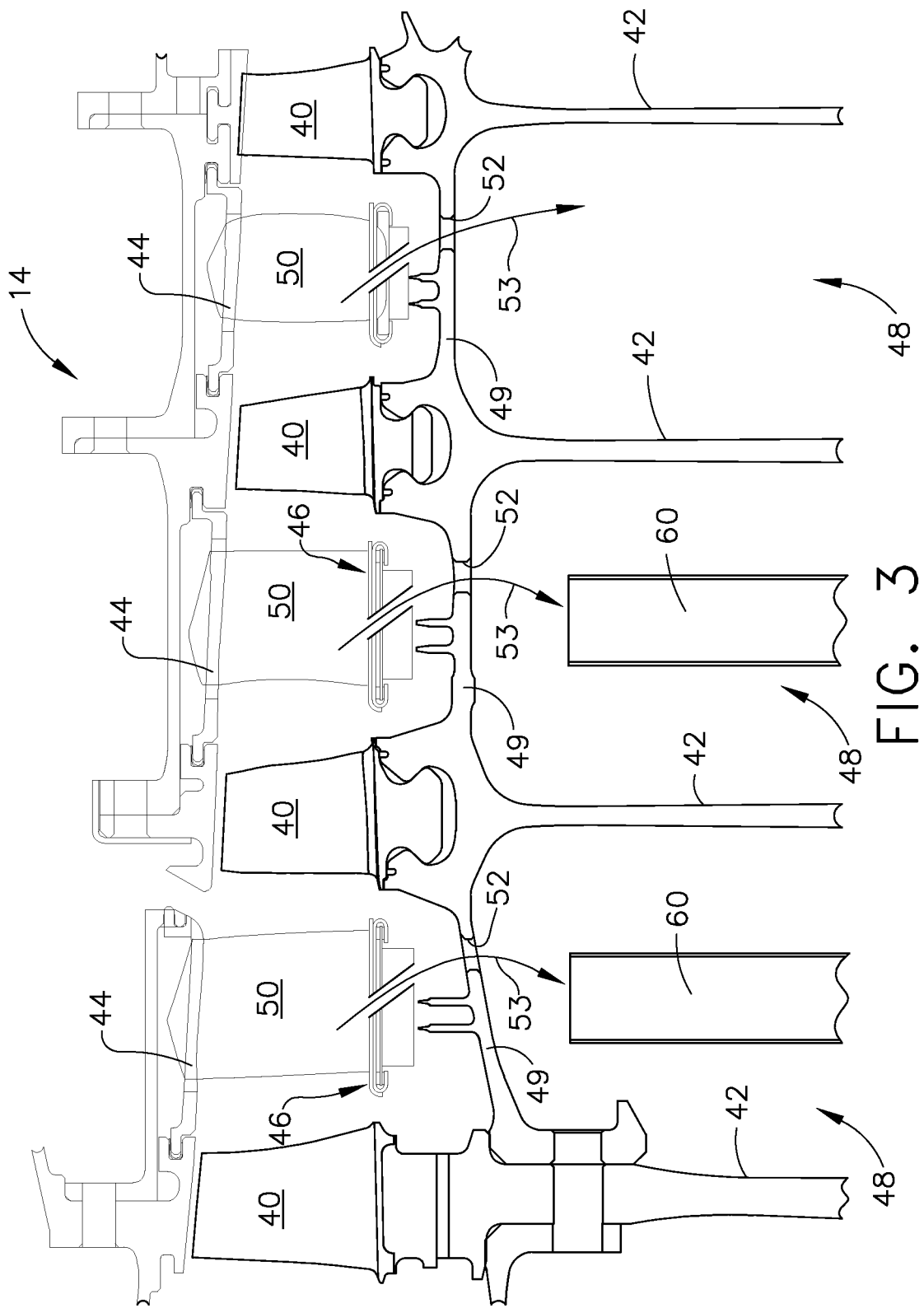
FIG. 3 is a detailed view of a portion of the high pressure compressor depicted in FIG. 2.

Referring now to FIG. 3, a detailed section view of a portion of the high pressure compressor 14 is depicted. In the embodiment shown, the rotor blades 40 and stator assembly 50 are located toward the aft end of the high pressure compressor 14. However, such is not limiting as the embodiments described may also be located toward the forward end of the high pressure compressor 14. Each of the stator assemblies 50 include a stator upper band 44 which is connected to a radially outer structure of the core 13 (FIG. 1). A stator inner band 46, which interfaces with the rotor structure 49, extends between the compressor rotor disks 42 and between the rotor blades 40.

Within the rotor structure 49 is at least one bleed air passage 52 which allows bleed air 53 to pass from near the stator inner band 46 into the off-take cavity 48. Once in the off-take cavity 48, the bleed air 53 passes through the impeller tubes 60 before moving to desired cooling locations.

Referring still to FIG. 3, the impeller tubes 60 are shown below the bleed air passage 52. In this view, the pressure drop for the system may be described. In prior art systems, the pressure drop measured from above the bleed air passage 52 and below the stator 50 is about 61 psi. However, the measured pressure drop between this area above bleed air passage 52 and the top of impeller tube 60 is about 55 psi with the instant embodiments. This decrease in pressure drop is accomplished by passing air through the stator assembly 50 which is stationary rather than around the end of the stator assembly 50 which is adjacent to the moving rotor blades 40. This bleed air passage 52 reduces swirl and therefore reduces pressure drop. Additionally, with the swirl decreased, the length of the impeller tube 60 may be decreased versus prior art systems. The reduction in impeller tube 60 length reduces weight of the gas turbine engine 10 and will result in increased engine performance.

Figure 4:
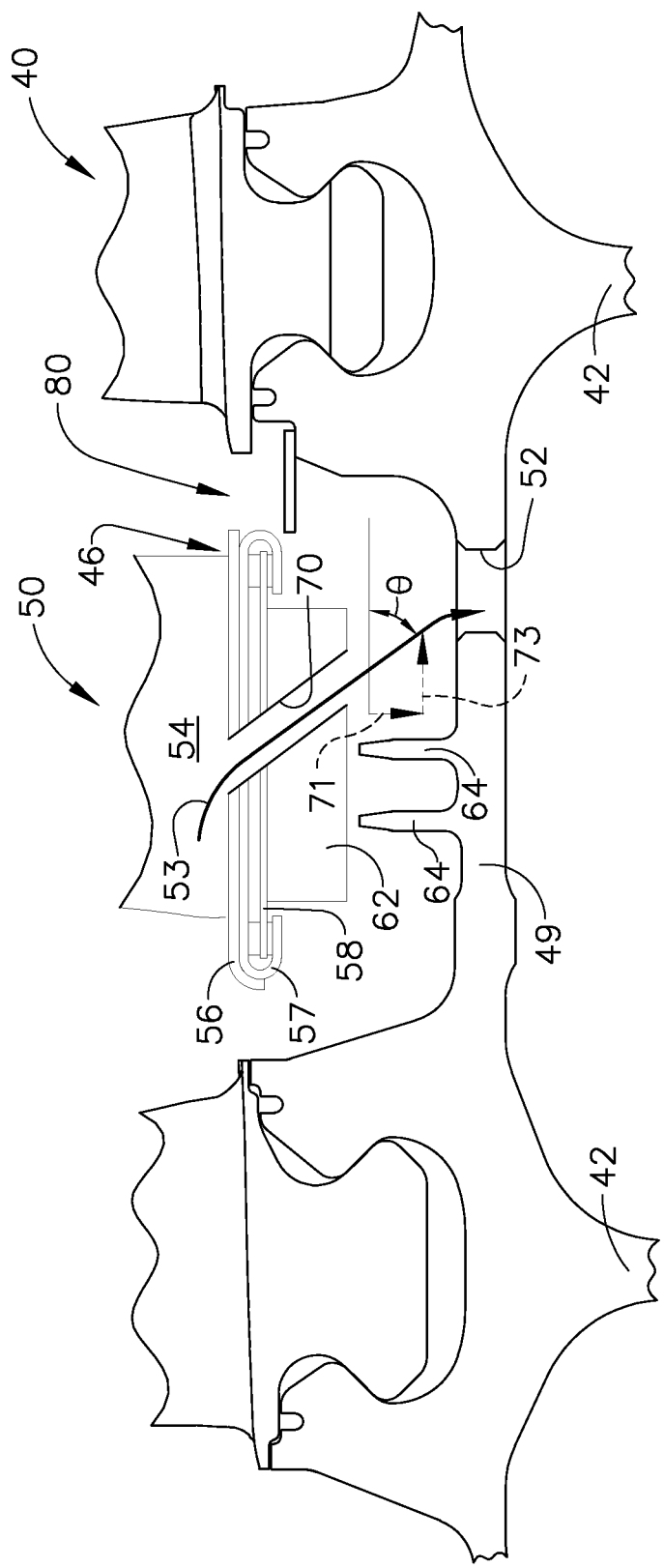
FIG. 4 is a portion of a stator having the off-take aperture in the stator vane.

Referring now to FIG. 4, a side view of a stator assembly 50 is depicted with two adjacent rotor blades 40. The stator assembly 50 includes a vane 54 having the stator inner band 46 depending therefrom. The stator inner band 46 is comprised of a stator flow surface 56 across which bleed air flow 53 moves. The stator flow surface 56 is positioned on a vane structural surface 57 which extends in an axial direction and is curved at axial ends about a backing plate 58. Depending from the backing plate 58 is a honeycomb layer 62 which engages seal teeth 64 extending radially outward from the rotor structure 49. The honeycomb layer 62 provides an abradable material against which the sealing teeth 64 may form a seal between the high pressure side of the high pressure compressor 14 and the lower pressure bleed air side including the off-take cavity 48. Although these structures are depicted in a laminate form, the structure may be formed of one or more pieces and formed of one or more materials.

The stator inner band 46 further comprises an off-take aperture 70 extending downwardly from the stator flow surface 56 through the stator inner band 46 and through the honeycomb layer 62. The off-take aperture 70 extends at an angle θ to the axial direction which is less than 90 degrees, forming a flow path through the stator assembly 50. The angle θ may be at least partially defined by components 71 and 73 which are radial and axial, respectively. The angle θ of the aperture flow path through the stator inner band 46 and honeycomb layer 62 may be about 45 degrees according to some embodiments. However, this angle is not limiting as other angles may be utilized. For example, it is desirable that the angle of turn of the bleed air 53 be less than 90 degrees and be greater than about 15 degrees. In this angle range, the kinetic head of the high pressure air above the stator flow surface 56 may be utilized to drive the bleed air 53 through the off-take aperture 70 and further through bleed air passage 52. Additionally, the angle of the off-take aperture 70 may be such that path way defined by the off-take aperture 70 extends radially downward and tangentially, and additionally may or may not have the axial component shown.

A discourager arrangement assembly 80 may be provided at the aft end of the stator assembly 50 and the forward end of the rotor 40. The discourager arrangement assembly 80 may include a structure extending from the stator assembly 50 and from the rotor 40 which effectively limit air flow between the stator assembly 50 and the rotor 40. Instead, such bleed air is now moved through the off-take aperture 70 at a reduced angle as compared to prior art embodiments wherein the air flow moves about the aft end of the stator assembly 50.

With the angled off-take aperture 70, the kinetic head or pressure above the stator inner band 46 drives the bleed air flow 53 through the stator inner band 46 and honeycomb layer 62 to the off-take cavity 48 by way of the bleed air passage 52.

Figure 5:
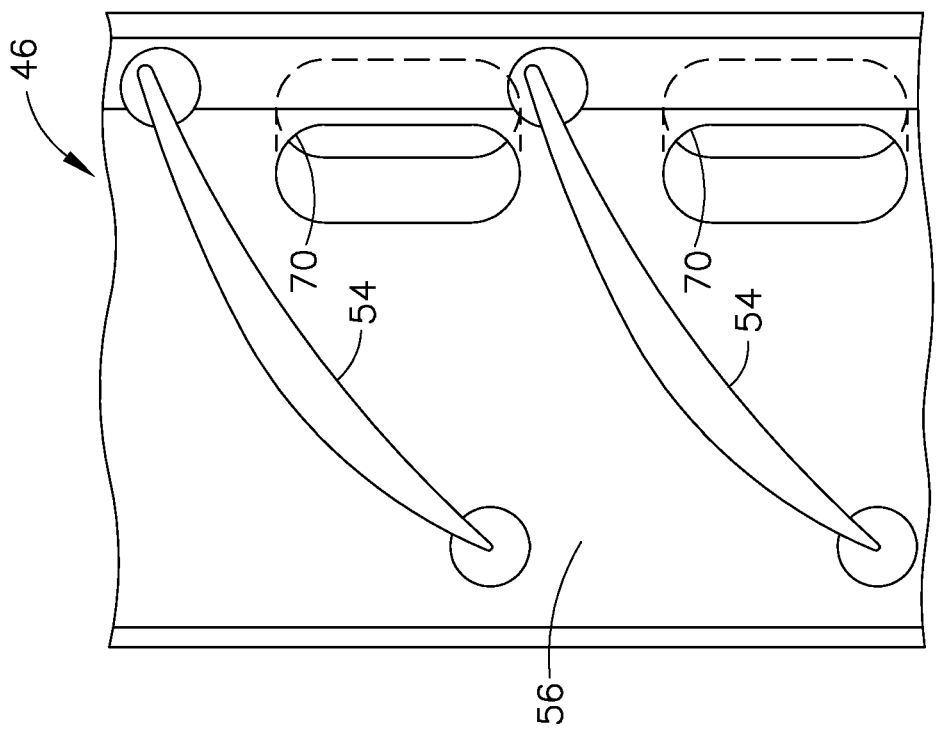
FIG. 5 is a top view of the stator vane depicting the off-take aperture.

Referring now to FIG. 5, a top view of the stator inner band 46 is depicted. The stator flow surface 56 is shown extending beneath the stator vanes 54. Between the vanes 54 at the axially aft end of the stator inner band 46 are off-take apertures 70. In the instant embodiment, the off-take apertures 70 are oval shaped. These extend at the angle previously described downwardly through the stator inner band 46, honeycomb layer 62 (FIG. 3) and into the off-take cavity 48. Such angle may include any or all of the axial direction and/or the tangential direction.

Figure 6:
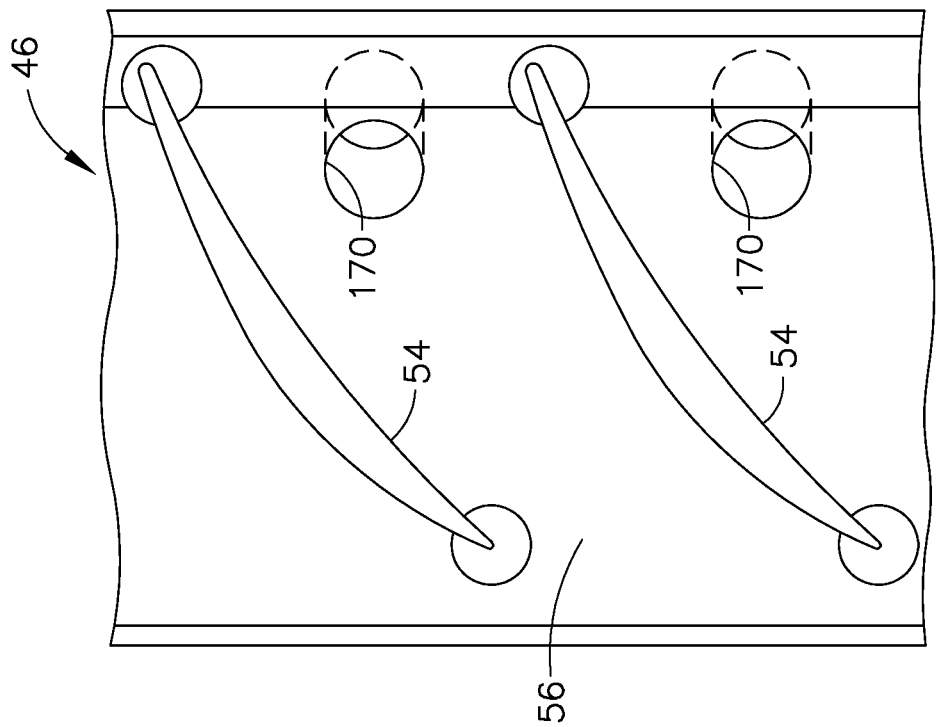
FIG. 6 is a top view of an alternate embodiment wherein the aperture is of a circular shape; and, FIG. 7 is a top view of a further alternate embodiment wherein the aperture is moved axially along the stator vane.

As an alternative embodiment, with reference now to FIG. 6, the off-take aperture 170 may be an alternative shape such as circular. In fact, the off-take aperture 170 may be various shapes, including square, rectangular, various polygon shapes or curvilinear openings that allow air flow to pass through in an efficient manner without creating unnecessary turbulence. Moreover, the shapes may be consistent or may differ along a single stator flow surface 56.

With reference now to FIG. 7, an additional top view is depicted wherein the off-take aperture 70 is moved from an axially rearward position to an axially forward position. In combination with the view of FIG. 4, the movement of the off-take aperture 70 may result in a variation of the angle of the air flow passage through the stator inner band 46. It is desirable to direct the bleed air 53 into the bleed air passage 52. It may be most desirable to direct the bleed air 53 straight through the bleed air passage 52. However, it may be necessary that the angle of the bleed air 53, as dictated in part by the off-take aperture 70 may require additional turns in the air flow. In any embodiment, however, the turning of the bleed air 53 will be less than the 90 degrees and less than air flow turned in prior art embodiments where the bleed air 53 had to pass the aft end of the stator inner band 46 before moving toward the bleed air passage 52.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A rotor off-take assembly for improved pressure recovery, comprising:
    a first rotor disk, including at least one first blade connected to the first rotor disk and extending radially outwardly;
    a second rotor disk, including at least one second blade connected to the second rotor disk and extending radially outwardly;
    an at least one stator assembly disposed between the first rotor disk and the second rotor disk;
    the stator assembly including a flow surface generally extending from adjacent the first rotor disk toward the second rotor disk;
    the stator assembly including an off-take aperture extending downwardly through the flow surface and exiting the stator assembly at a non-perpendicular angle relative to the axial direction;
    wherein air passes through the off-take aperture of the stator assembly reducing swirl.

2. The rotor off-take assembly for improved pressure recovery of claim 1 further comprising a bleed air passage in a rotor structure.

3. The rotor off-take assembly for improved pressure recovery of claim 2 further comprising an impeller tube disposed radially inward of the at least one stator assembly.

4. The rotor off-take assembly for improved pressure recovery of claim 3, wherein the off-take aperture and the impeller tube arrangement results in decreased pressure drop between the off-take aperture and impeller tube.

5. The rotor off-take assembly for improved pressure recovery of claim 1, wherein the off-take aperture comprises a circular cross-sectional shape, an oval cross-sectional shape, a square cross-sectional shape, a rectangular cross-sectional shape, a polygonal cross-sectional shape, and/or a curvilinear cross-sectional shape.

6. The rotor off-take assembly for improved pressure recovery of claim 1, wherein the off-take aperture extends downwardly through the at least one stator assembly and exits the at least one stator assembly at an angle from about 15 degrees to less than 90 degrees relative to the axial direction.

7. The rotor off-take assembly for improved pressure recovery of claim 6 further comprising a backing plate.

8. The rotor off-take assembly for improved pressure recovery of claim 7 further comprising a honeycomb layer, the off-take aperture extending downwardly through the honeycomb layer and exiting the honeycomb layer at an angle from about 15 degrees to less than 90 degrees relative to the axial direction.

9. The rotor off-take assembly for improved pressure recovery of claim 8, wherein the off-take aperture extends through the backing plate and the honeycomb layer.

10. The rotor off-take assembly for improved pressure recovery of claim 1, wherein the off-take aperture is disposed axially rearwardly along the at least one stator assembly.

11. The rotor off-take assembly for improved pressure recovery of claim 1, wherein the air from the flow surface turns less than about 90 degrees in moving through the at least one stator assembly.

12. The rotor off-take assembly for improved pressure recovery of claim 1 further comprising a discourager.

13. The rotor off-take assembly for improved pressure recovery of claim 12, wherein the discourager extends from one of the rotors and the at least one stator assembly.

14. A rotor off-take assembly, comprising:
    a first rotor disk and a second rotor disk, a plurality of rotor blades extending from the first and second rotor disks;
    a bleed air passage disposed in a rotor structure between the first and second rotor disks;
    a stator assembly located between the rotor blades, the stator assembly including a flow surface, a honeycomb layer, and an off-take aperture providing flow communication from a stator flow surface to the bleed air passage, wherein the off-take aperture extends downwardly through the honeycomb layer at an angle from about 15 degrees to less than 90 degrees relative to the axial direction, and wherein the off-take aperture communicates with the bleed air passage at a non-perpendicular angle relative to the axial direction.

15. The rotor off-take assembly of claim 14 further comprising an impeller tube radially spaced from the off-take aperture within a radial cavity.

16. The rotor off-take assembly of claim 14 further comprising a discourager assembly reducing flow from passing around axial ends of the stator assembly and moving toward the bleed air passage.

17. The rotor off-take of claim 14, wherein the off-take aperture extends through the stator assembly having a radial component and an axial component, the axial component having an angle from about 15 degrees to less than 90 degrees where the off-take aperture exits the stator assembly.

18. A stator assembly for a gas turbine engine, the stator assembly comprising:
    a stator inner band comprising a flow surface and a honeycomb layer configured to engage one or more seal teeth extending radially outward from a rotor structure;
    a plurality of stator vanes extending radially from the stator inner band; and a plurality of off-take apertures extending downwardly and axially rearward through the stator inner band, wherein the plurality off-take apertures extend downwardly through the honeycomb layer at an angle from about 15 degrees to less than 90 degrees relative to the axial direction, and wherein the plurality of off-take apertures exit the stator assembly at a non-perpendicular angle relative to the axial direction, and wherein the plurality of off-take apertures are disposed radially between respective ones of the plurality of stator vanes.

19. The stator assembly of claim 18, comprising:
a discourager assembly configured to reduce flow from passing around axial ends of the stator inner band.

20. A stator assembly of claim 19, wherein during operation in a gas turbine engine, air passing through the plurality of off-take apertures and exiting the stator assembly at a non-perpendicular angle relative to the axial direction enters into a plurality of bleed air passages in the rotor structure, reducing swirl.

* * * * *